Nov. 15, 1927.

F. LAFEUILLE 1,649,601

ROTARY TUBULAR CRYSTALLIZER COOKER

Filed April 23, 1926

Inventor
F. Lafeuille
by
Langner Parry Card & Langner Att'ys.

Patented Nov. 15, 1927.

1,649,601

UNITED STATES PATENT OFFICE.

FERNAND LAFEUILLE, OF PARIS, FRANCE.

ROTARY TUBULAR CRYSTALLIZER COOKER.

Application filed April 23, 1926, Serial No. 104,160, and in France May 20, 1925.

The present invention has for its object an apparatus employed in sugar making (or in the chemical industry), in which the characteristic arrangements of a cooking apparatus and those of a mixer crystallizer have been combined in a new manner, that is to say in which it is possible, alternatively and without it being necessary to effect any transference of the cooked mass, to carry out the operations of cooking and those of crystallization in movement; this result is obtained under particularly advantageous conditions both from the point of view of thermal efficiency and that of whiteness and of the unimpaired character of the products being treated, these two advantages resulting from the mechanical arrangement of the apparatus, the vat of which, instead of being fixed as in the known apparatus, is movable about its axis, which effects at the same time the constant and complete kneading of the mass under treatment and the continual displacement of the heating members relatively to the heated mass.

Two forms of the invention are illustrated diagrammatically and simply by way of example in the accompanying drawings in which.

Figure 1:
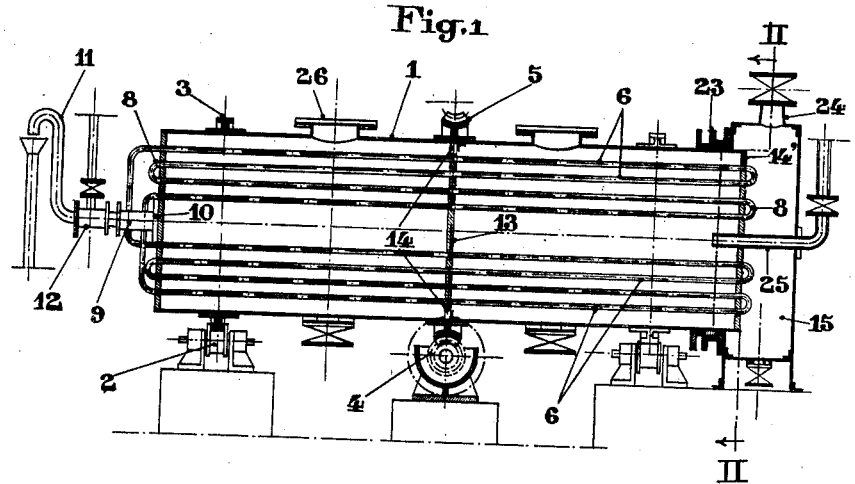
Figure 1 is a longitudinal section taken along the axis of an apparatus constructed according to a first form of the invention.

The heating part of this apparatus is of the same general arrangement as the apparatus known under the name of Lafeuille system crystallizer with a uniform thermal region, forming the subject of U. S. application No. 42,802; this heating part comprises essentially a cylindrical body 1 turned upon rollers 2 by means of rolling tracks 3, the movement being controlled by a worm 4 which drives the toothed crown wheel 5. Circulation tubes 6, 6, 6 . . . disposed for example upon two arcs of spirals 7, 7, connect together the two flat ends of the vat. These tubes are connected in pairs by means of communication boxes or headers 8, 8 . . . fixed against the outer walls of the flat ends. The circulating water (or steam) enters through a central tubulure or pipe connection 9 provided with a stuffing box 10. The used water or water of condensation is discharged through a pipe 11 by means of another stuffing box 12 suitably disposed. Staying plates 13 perforated to allow the passage of the tubes and also provided with apertures 14 to allow the circulation of the cooked mass are provided in order to support the tubes. This arrangement is that of the known crystallizer.

According to the present invention this apparatus is modified in the following manner. One of the flat ends of the apparatus, the one which is opposite the inlet and the outlet of the circulating water, instead of being solid, as in the simple crystallizer, comprises apertures 14' similar to those provided in the staying plates for the circulation of the cooked mass.

Further, the rotating vat 1 is extended at the same end by a circular part 15 of larger diameter which constitutes the vacuum chamber.

Figures 2, 4:
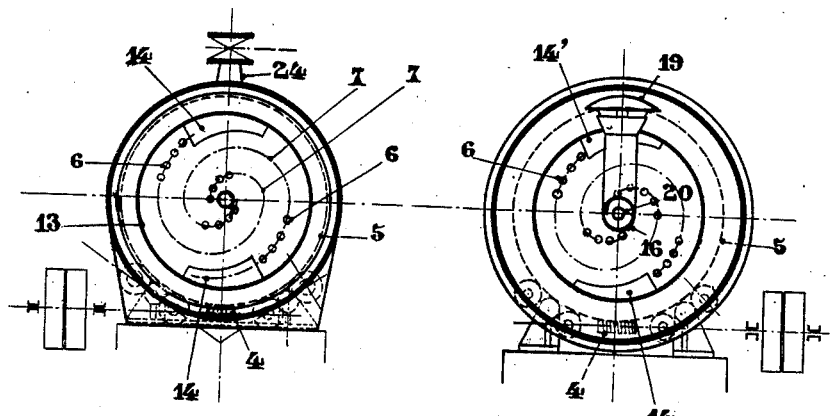
Figure 2 is a cross section through the apparatus, the section being taken along the line II—II in Figure 1 and viewed in the direction of the arrows.
Figures 3 and 4 are similar views of a modified form of the apparatus, Figure 4 being a section taken along the line IV—IV in Figure 3.
Figure 3:
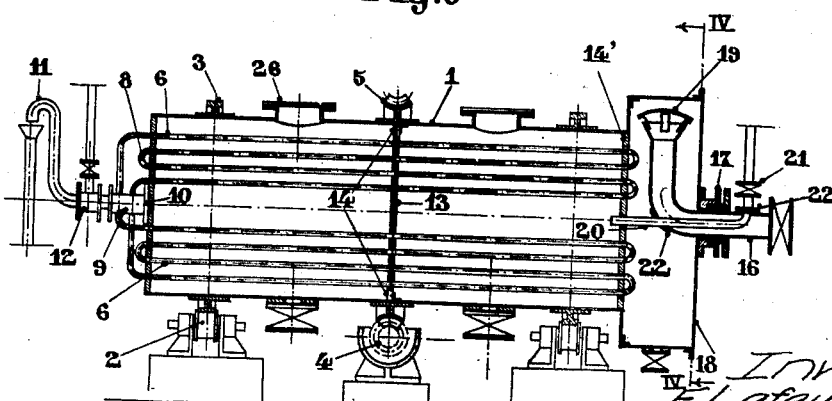

The vacuum chamber may be rotary, that is to say fixed in an unvarying manner relatively to the vat 1 from which it extends (Figs. 3 and 4). In this case the vacuum intake is formed by a bent pipe 16 which is fixed and which passes, by means of a stuffing box 17, through the vertical wall 18 of the vacuum chamber. A cover in the form of a lamp shade 19 is placed above the orifice of the vacuum intake pipe in order to prevent drops of the cooked mass from falling into this pipe. A pipe 20 with a cock 21 and rigid connections 22, upon the vacuum tube serves to admit syrup into the crystallizer-cooker for feeding the cooked mass.

Another arrangement (Figs. 1 and 2) consists in making the vacuum chamber stationary. In this case the connection between this chamber and the rotating vat is effected by means of a large annular stuffing box 23. With regard to the vacuum intake this is formed quite simply at 24 upon the calendar of the vacuum chamber. The admission of syrup takes place through the pipe 25 placed in alignment with the axis of the apparatus.

This apparatus operates in the following manner:

A cooked mass having been run into the apparatus through one of the valves or manholes 26, 26 . . . . the cooling of the cooked mass is effected by rotating the apparatus and making water circulate through the tubes in the usual manner. Then, having obtained all the crystallization possible from the cooling, the mass is heated by means of a current of hot water or steam, the vacuum is made to act, by opening the valve provided for this purpose and charges of syrup are passed through the pipe disposed for this purpose. That is to say the apparatus is employed at this moment in the same way as would be a true cooking apparatus, in which advantage is taken, which will be appreciated by all manufacturers, resulting from the mobility of the heating surfaces relatively to the cooked mass. The cooked mass having been again brought to the suitable temperature and degree of concentration, the heating is stopped and a new cooling operation is commenced, the vacuum being left open or otherwise.

Another use of this apparatus, which use enables a great deal of time to be gained in the boiling, consists in running into the crystallizer-cooker an ungranulated mass, that is to say a syrup which is simply highly concentrated (what is called in sugar-making a filament boiling).

By means of a well regulated cooling the formation of the grain (granulation) will be obtained in the crystallizer. Once the mass is well cooled it is reheated and cooled again as hereinbefore described.

This apparatus is particularly suitable for the treatment of cooked masses having a tendency to emulsify as is the case with nearly all the cooked masses of molasses treated in the making and refining of cane sugar. On account of the employment of the vacuum the gases produced by the decomposition of the organic acids are eliminated so rapidly as they are formed and it is possible without disadvantage to heat and re-heat the cooked masses without running the risks of having them swell and change colour as a consequence of the emulsion.

The arrangements of detail of the apparatus which have been described above may naturally vary. For instance the distribution and arrangement of the circulation tubes may be modified as described in my prior specification No. 42,802.

Having now particularly described and ascertained the nature of my said invention and in what manner the same is to be performed, I declare that what I claim is:—

1. A crystallizer-cooker for cooked masses, comprising, a tubular cylindrical body mounted for axial rotation, and constituting a chamber, tubes intersecting said chamber adapted selectively to conduct heating or cooling media, a header of larger diameter than that of said tubular body at one end thereof said header forming a steam-dome for collecting the steam from the product within said chamber, and an evacuation pipe communicating with said header.

2. A crystallizer-cooker for cooked masses, comprising, a tubular cylinder body mounted for axial rotation, and constituting a chamber, end-walls for said chamber, tubes running longitudinally through said chamber and supported in end-walls, said tubes being adapted selectively to conduct heating or cooling media, a header of larger diameter than that of said tubular body at one end thereof, said header forming a steam-dome collecting the steam from the heated product within said chamber, said end-wall adjacent said steam-dome being perforated to afford communication between said chamber and steam-dome, and an evacuation pipe communicating with said header.

3. A crystallizer-cooker for cooked masses comprising a tubular cylindrical body mounted for axial rotation and constituting a chamber, end-walls for said chamber, tubes running longitudinally through said chamber and supported in said end-walls, said tubes being adapted selectively to conduct heating or cooling media, means adjacent one end-wall and communicating with said tubes, for the supply and discharge of said heating or cooling media, a header of larger diameter than that of said tubular body adjacent the opposite end-wall, said header constituting a steam-dome collecting the steam from the heated products in said steam chamber, the end-wall adjacent said chamber being perforated to afford communication between said chamber and header, and an evacuation pipe communicating with said header.

In testimony whereof I have signed my name to this specification.

FERNAND LAFEUILLE.